United States Patent [19]
Takuya et al.

[11] Patent Number: 5,831,238
[45] Date of Patent: Nov. 3, 1998

[54] METHOD AND APPARATUS FOR BONDING USING BRAZING MATERIAL AT APPROXIMATELY ATMOSPHERIC PRESSURE

[75] Inventors: Miyakawa Takuya; Mori Yoshiaki; Kurashima Yohei; Anan Makoto, all of Suwa, Japan

[73] Assignee: Seiko Epson Corporation, Tokyo, Japan

[21] Appl. No.: 512,740

[22] Filed: Aug. 8, 1995

[51] Int. Cl.⁶ .................................................. B23K 10/00
[52] U.S. Cl. ........................... 219/121.59; 219/121.41; 219/121.43; 228/35
[58] Field of Search .................. 219/121.59, 121.43, 219/121.44, 121.52, 121.41; 156/643.1, 646.1, 345; 228/33, 42, 35, 52

[56] References Cited

U.S. PATENT DOCUMENTS

| | | | |
|---|---|---|---|
| 3,762,941 | 10/1973 | Hou . | |
| 4,012,307 | 3/1977 | Phillips | 204/192 E |
| 4,430,547 | 2/1984 | Yoneda et al. | 219/121.43 |
| 4,705,593 | 11/1987 | Haigh et al. | 156/635 |
| 4,708,766 | 11/1987 | Hynecek | 156/643 |
| 4,749,440 | 6/1988 | Blackwood et al. | 156/646 |
| 4,857,382 | 8/1989 | Liu et al. | 428/156 |
| 4,921,157 | 5/1990 | Dishon et al. . | |
| 5,000,819 | 3/1991 | Pedder et al. | 156/643 |
| 5,045,166 | 9/1991 | Bobbio . | |
| 5,120,568 | 6/1992 | Schuurmans et al. . | |
| 5,126,164 | 6/1992 | Okazaki et al. . | |
| 5,147,520 | 9/1992 | Bobbio . | |
| 5,178,682 | 1/1993 | Isukamoto et al. | 118/722 |
| 5,201,995 | 4/1993 | Reisman et al. . | |
| 5,225,659 | 7/1993 | Kusano et al. . | |
| 5,240,559 | 8/1993 | Ishida | 456/666 |
| 5,290,378 | 3/1994 | Kusano et al. . | |
| 5,292,370 | 3/1994 | Tsai et al. . | |
| 5,316,739 | 5/1994 | Yoshikawa et al. | 422/186.05 |
| 5,340,618 | 8/1994 | Tanisaki et al. . | |
| 5,368,685 | 11/1994 | Kumihashi et al. | 156/643 |
| 5,384,167 | 1/1995 | Nishiwaki et al. | 427/569 |
| 5,391,855 | 2/1995 | Tanisaki . | |
| 5,399,830 | 3/1995 | Maruyama . | |
| 5,407,121 | 4/1995 | Koopman et al. . | |
| 5,449,432 | 9/1995 | Hanawa . | |
| 5,499,754 | 3/1996 | Bobbio et al. | 228/42 |
| 5,597,438 | 1/1997 | Grewal et al. . | |

FOREIGN PATENT DOCUMENTS

| | | |
|---|---|---|
| 371 693 | 6/1990 | European Pat. Off. . |
| 59-158525 | 9/1984 | Japan . |
| 60-1861 | 1/1985 | Japan . |
| 61-127866 | 6/1986 | Japan . |
| 2-190489 | 7/1990 | Japan . |
| 2-281734 | 11/1990 | Japan . |
| 3-174972 | 7/1991 | Japan . |
| 3-219082 | 9/1991 | Japan . |
| 3-236475 | 10/1991 | Japan . |
| 4-186619 | 7/1992 | Japan . |
| 6-190269 | 12/1992 | Japan . |
| 5-82478 | 4/1993 | Japan . |
| 6-2149 | 1/1994 | Japan . |

*Primary Examiner*—Mark H. Paschall
*Attorney, Agent, or Firm*—Stroock & Stroock & Lavan LLP

[57] ABSTRACT

A method and apparatus for bonding components with a brazing material is described in which atmospheric plasma with active species is created by gas discharge generated in a gas capable of discharge at or about atmospheric pressure, and a portion of a component is exposed to the atmospheric plasma, thereby surface treating it. Prior to, simultaneously with, or following the surface treatment, bonding is accomplished with a brazing material. Surface treating the portion of the component allows using solder and, for example, a low-corrosive or no-rinse flux, or no flux, in an efficient bonding process. Furthermore, unwanted organic substances, for example, left over flux, may be removed by exposing the component to surface treatment, for example, after bonding is completed, or, if the component has residual undesirable organic substances, for example, left over from its manufacture, surface treatment may be performed prior to bonding.

55 Claims, 14 Drawing Sheets

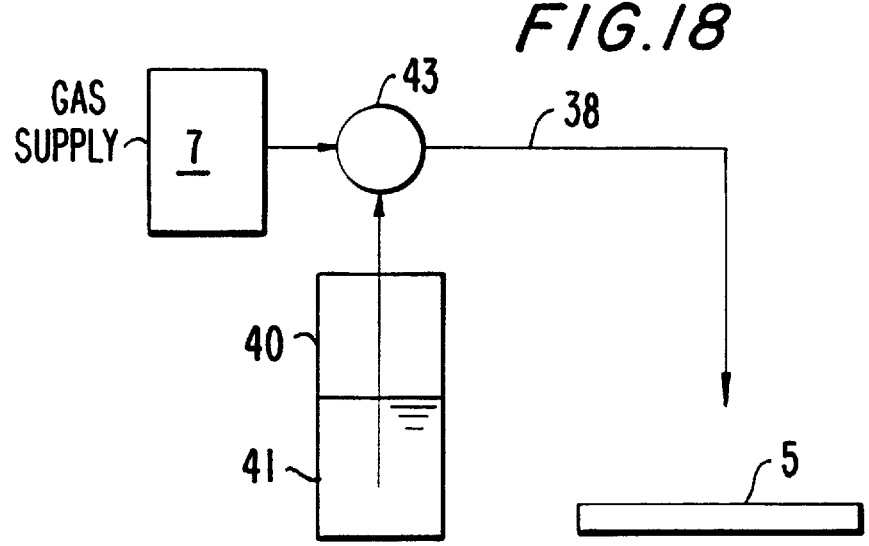
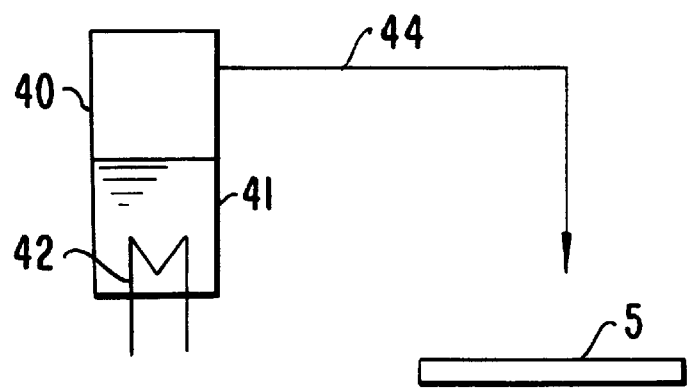

METHOD AND APPARATUS FOR BONDING USING BRAZING MATERIAL AT APPROXIMATELY ATMOSPHERIC PRESSURE

CROSS-REFERENCE TO RELATED APPLICATIONS

This application is a continuation-in-part of International Application PCT/JP94/00573, with an international filing date of Apr. 6, 1994, now pending, entitled "Method and Apparatus for Bonding Using Brazing Material," by inventors Miyakawa Takuya, Mori Yoshiaki, Kurashima Yohei and Anan Makoto. This application is incorporated herein by reference as though fully set forth.

BACKGROUND OF THE INVENTION

1. Field of Technology

This invention relates generally to a soldering method and apparatus that uses a brazing material to bond components together, and more particularly to a soldering method and an apparatus which may be suitable for use in soldering applications performed in small areas or requiring fine detailed work, such as in bonding electronic components to a printed circuit board.

2. Background of Technology

Traditionally, the soldering methods most suitable for industrial mass production have been the flow method and the reflow method. For example, the flow method is often used for mounting components onto a printed circuit board or other workpiece (hereinafter referred to generally as "substrate"). In the flow method, a substrate on which electrical or other components have been placed is coated with flux, and then soldering is achieved by passing the substrate, components and flux through a molten solder bath thus soldering the components to the substrate.

In the reflow soldering method, a mixture of flux and soldering paste is applied, or printed onto that part of the substrate on which the electrical or other components are to be soldered. Then, the components are placed on the substrate over this flux and solder paste layer and soldering is achieved by passing the substrate and components through a heating oven, otherwise known as a "reflow oven" thus soldering the components to the substrate.

However, it is often difficult to consistently and uniformly produce an even coating of flux on the bonding portions of the substrate. This is true whether the flux coating is applied over components, as in the flow method, or directly onto the substrate, as in the reflow method. For this reason, the coating step has become a major obstacle to achieving automation in semiconductor manufacture as substrate patterns have become finer and the density of electrical or other components has increased. Furthermore, in both methods, residual flux on the substrate may be corrosive or otherwise detrimental to the electrical or other components, and thus, it is usually necessary to rinse and clean the substrate after soldering has been completed, thereby requiring yet another process step. Additionally, when soldering a TAB substrate to a liquid crystal panel, for example, there is the potential problem that the soldering flux may splash and contaminate the polarizing film. Consequently, it is usually necessary to attach a protective film to the polarizing film before soldering, and then to remove this film after the soldering is finished. These additional process steps increase the total number of process steps, time, and labor, resulting in increased manufacturing costs and lower manufacturing efficiency.

Known methods of removing or otherwise cleaning organic substances, such as flux from a substrate include the wet rinse method which uses an organic solvent to remove organic substances such as flux, and the dry rinse method, which removes organic substances such as flux by causing decomposition by chemical reaction, for example by irradiation with ozone, and/or ultraviolet light.

However, the wet rinse method requires an additional cleaning process for removing the rinsing agent after the organic substances have been rinsed off, a process for drying the substrate, and a facility for performing these processes. These additional process step requirements for the wet rinse method necessitate a massive amount of time and labor and typically result in increased manufacturing costs and lowered overall efficiency.

On the other hand, thorough cleaning of organic substances cannot always be expected using the dry rinse method since it is difficult to completely remove certain organic substances, especially those possessing, for example, especially large molecular weight.

To avoid the problems of conventionally used rinse methods, no-rinse fluxes containing very little or no activators, for example, chlorine, have been in use recently. However, because these fluxes possess poor wettability compared with conventional fluxes, the use of these no-rinse fluxes raises the potential that the resulting bond may be incomplete or may have insufficient bonding strength to be used reliably for joining the components to a substrate.

Furthermore, when components must be soldered on both sides of a substrate, the heat treatment applied during the soldering of components on one side often causes the formation of an oxide film, for example, CuO on the surface of the copper pads and electrodes. The heating also may cause the loss of even the initial level of wettability on the side still to be bonded. In some cases, the heat treatment even leads to increased contact resistance during soldering.

Unexamined Japanese patent application No. H03-174972 discusses a method which obtains excellent adhesion of a soldering material to a substrate. In this method, the substrate bonding surface is exposed to argon plasma generated in a low pressure argon gas atmosphere by an electrical discharge. This argon plasma generated by electrical discharge is used to remove impurities from the bonding surface of the substrate and to improve its wettability. Then the substrate is coated with the soldering material.

However, this method necessarily requires a vacuum pump and a vacuum chamber for obtaining the low pressure argon gas atmosphere, making the overall processing apparatus large and complicated. Furthermore, argon, the gas used for generating electrical discharge, does improve the wettability between the soldering paste and the substrate, thus improving the printability of the paste solder, however, it does not improve the wettability of the solder itself for the components since it does not remove the oxide film. Therefore, using this method, it is still necessary to coat the soldering surface with a flux in order to remove the oxide film before soldering, and consequently, this flux must be rinsed off after the soldering process is completed.

Furthermore, unexamined Japanese patent application No. S3-127965 discusses an apparatus that is equipped with a device which generates an arc discharge between itself and the components to be soldered, and thus quickly heats the components. This device makes it easy to solder a component, even if its heat capacity is excessively large. However, with this device, the electrical discharge is used to generate the heat required for soldering, and cannot be used to remove an oxide film or improve the wettability. Furthermore, since the gas used for generating the discharge is an inert gas, removal of the oxide film would not be expected to occur in theory. This method also requires that the soldering surface be coated with a flux in order to remove the oxide film, necessitating that the flux must then be rinsed off after soldering. Thus, additional process steps are required which lower the efficiency and raise the costs of the overall manufacturing process.

Accordingly, it is desired to provide an improved method and apparatus for bonding using brazing material.

SUMMARY OF THE INVENTION

Generally speaking, the present invention provides a method and apparatus for bonding that uses a brazing material to bond two components into one, in which at least one step or part includes generating a gas discharge in a gas capable of discharge at or about atmospheric pressure; and in that the method and apparatus includes a surface treatment which exposes the surface of at least one of the components to atmospheric plasma containing active species and excited gas molecules or ions generated in the gas by the electrical discharge. An excellent bond can be obtained by applying such a surface treatment at least before, during, or after the bonding of the two components.

Furthermore, when solder is used as the brazing material, the invention provides a soldering method and apparatus that, by properly selecting the gas capable of discharge used for gas discharge, may also remove undesirable substances, for example, organic substances or oxides from the surface to be bonded in advance of applying the solder, thus improving the wettability with the solder and effectively removing the organic substances such as flux that remain after the soldering step is complete. In particular, this substantial improvement in the wettability, for example, enables soldering without the use of flux, or, for using a no-rinse flux which may have inherent low wettability.

To improve wettability, all types of gases, such as helium and nitrogen, may be effective. To obtain an ashing effect, compressed air, helium, or a mixed gas of nitrogen and oxygen may be effective. For etching, a mixed gas, such as a mixture of helium or compressed air and fluorocarbon compounds ($CF_4$, $C_2F_6$) or $SF_6$ may be effective.

Additionally, the apparatus and method of the invention includes steps or device which may further increase the above-mentioned ashing effect by introducing water vapor or moisture to the atmospheric plasma while exposing the surface of the material to be surface treated to atmospheric plasma also containing active species. This may be accomplished by adding steam or directly supplying moisture to the gas capable of discharge prior to electrical discharge, or by supplying moisture directly to the surface of the substrate to be treated when it is exposed to the atmospheric plasma or reactive gas flow generated by electrical discharge.

A good gas discharge may be generated in the method and apparatus of the invention, for example, by using high-frequency voltage, at frequencies such as 13.56 MHz or around 10–30 kHz to generate electrical discharge in a gas capable of discharge.

The apparatus and method of the invention also provides using a brazing material to bond two components together, and, more particularly, provides that the apparatus and method includes a surface-treater that includes a gas discharger device for generating electrical discharge in a gas capable of discharge at or about atmospheric pressure. A gas supply may supply a gas capable of discharge to the gas discharger for generating electrical discharge. A gas jetting port is provided for exposing the surface of at least one of the components to the atmospheric plasma containing active species, such as excited gas molecules or ions, generated by the electrical discharge.

Furthermore, the method and apparatus of the invention includes a soldering device or step that, when using solder as a brazing material, may also remove such undesirable materials as oxide from the bonding surface, improve wettability, and may effectively remove organic substances, such as flux, that may remain after soldering.

To generate the gas discharge at or about atmospheric pressure, it is possible to use electrodes connected to a high-frequency power supply, and to directly expose the material to be treated to the atmospheric plasma thus generated, by generating the electrical discharge by applying voltage from a power supply to the substrate or material to be treated which may be grounded. In another example, a gas flow of atmospheric plasma containing active species, jets out from the discharger and is directly applied to the substrate or material to be treated, thus exposing it to active species contained within the atmospheric plasma. In this case, damage to the substrate can be minimized by a device for trapping ions contained in the atmospheric plasma flow by, for example, providing a metal mesh on the gas jetting out port. In this way, low-cost, high-quality soldering can be achieved, especially when bonding components to a substrate.

The invention solves the above-mentioned problems associated with conventional technologies, and has as an object to provide a method and a device for soldering or bonding two components, that can easily improve the wettability of the surfaces to be bonded.

Another object of the invention is to provide a method and a device for soldering using a low-corrosive, no-rinse flux, or without the use of a flux.

Yet another object of the invention, in cases involving the bonding of electronic components to a substrate by soldering, is to provide a method and a device that improve the wettability of the substrate without damaging it, and to make it possible to consistently obtain good soldering results, even for bonding processes involving fine wiring patterns or small areas.

Still other objects and advantages of the invention will in part be obvious and will in part be apparent from the specification.

The invention accordingly comprises the several steps and the relation of one or more of such steps with respect to each of the others, and the apparatus combines features of construction, combinations of elements and arrangement of parts which are adapted to affect such steps, all as exemplified in the following detailed disclosure, and the scope of the invention will be indicated in the claims.

BRIEF DESCRIPTION OF THE DRAWINGS

For a fuller understanding of the invention, reference is had to the following description taking in connection with the accompanying drawings, in which:

FIGS. 18 and 19 are schematic block diagrams that show embodiments that differ from that in FIG. 17, in which moisture is supplied to the atmospheric plasma containing active species generated by electrical discharge in the discharger.

DESCRIPTION OF THE PREFERRED EMBODIMENTS

Figure 1:
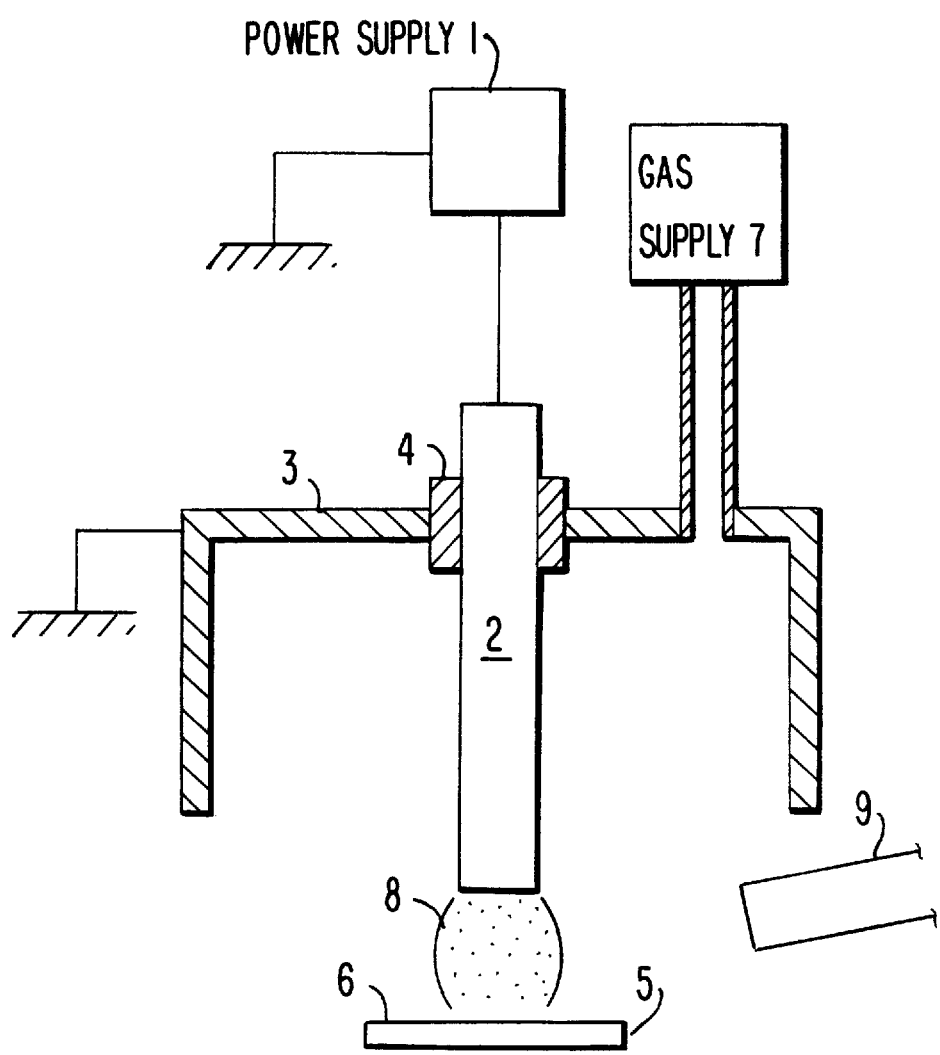
FIG. 1 is a schematic diagram showing a surface-treatment method apparatus used in the bonding apparatus of the invention.

Reference is first made to FIG. 1 which depicts one configuration of a surface-treatment apparatus or surface-treater used in the bonding apparatus of the present invention. A long, thin, round, bar-shaped electrical discharge electrode 2 coupled to a power supply 1 is held electrically suspended by an insulator 4 in the center of a metal cover 3 which forms an approximately cylindrical shape and which is open at one end and is grounded. A substrate 5 is positioned perpendicularly with respect to the length of electrode 2 at a specified distance from electrode 2 on a support table (not shown). The end of electrode 2 protrudes past the end of metal cover 3, and a bonding surface 6 for soldering electronic or other components faces the protruding end of electrode 2. The interior of the chamber formed by metal cover 3 is connected to a gas supply 7 which supplies a gas capable of discharge.

The gas capable of discharge is supplied from gas supply 7 to the interior of the chamber formed by metal cover 3, thereby replacing the ambient atmosphere within the chamber and, by escaping out the open end, between electrode 2 and substrate 5. By applying high frequency voltage from power supply 1 to electrode 2, a gas discharge may be generated at or about atmospheric pressure between the protruding end of electrode 2 and bonding surface 6 of substrate 5 which may be grounded, or if not grounded, between the protruding end of electrode 2 and the support table, which in this case is grounded. In a discharge region 8, which is located in the path of the electrical discharge between electrode 2 and bonding surface 6 of substrate 5 or the support table, atmospheric plasma generated by the above-mentioned electrical discharge causes various types of reactions, such as dissociation, ionization, and excitation within the gas capable of discharge thus creating active species. Exposing bonding surface 6 of substrate 5 to the atmospheric plasma containing active species generated in the above-mentioned gas discharge by these reactions, may improve bonding surface 6, by greatly enhancing its hydrophilicity or wettability with respect to solder. By using the apparatus and method of the invention, good soldering results may be obtained even when no flux is used, or when a no-rinse flux, ordinarily possessing low wettability, is used. In one working example, it is found that it is preferable to use high-frequency voltage of 13.56 MHz or 20 KHz as the voltage to be applied to electrode 2, depending on the type of gas capable of discharge used.

Any type of gas capable of discharge, for example, an inert gas such as helium or argon, or nitrogen, compressed air, or oxygen and mixtures thereof, may be used as the gas capable of discharge supplied from gas supply 7 as long as it does not adversely effect the substrate. For example, if oxidation of the substrate is not desirable, it is recommended that the gas capable of discharge includes gases other than oxygen. Generally speaking, applying high-frequency voltage to an inert gas, such as helium or argon at or about atmospheric pressure facilitates the generation of a stable and uniform electrical discharge, thus minimizing the damage to bonding surface 6 of substrate 5 exposed to the discharge. However, the costs of this process will be increased because of the high price of the inert gas itself. To solve this cost issue, it is preferable to replace the ambient atmosphere near electrode 2 and substrate 5 with an inert gas that facilitates generation of a stable electrical discharge, such as inert gases including helium or argon, just during the start of the electrical discharge. Then, once the electrical discharge has taken place through application of high frequency voltage, a switch can be made to another appropriate but less expensive gas capable of maintaining the stable discharge and selected depending on the surface treatment desired.

Surface treatment using the above-mentioned electrical discharge can be used for improving the wettability of bonding surface 6 of substrate 5, as well as for the preprocessing and postprocessing steps required for a complete soldering process, as described below. For example, to remove any excess organic substances adhering to bonding surface 6 of substrate 5 in advance, or to remove excess flux after soldering, a mixed gas containing helium and oxygen may be supplied from gas supply 7. This gas generates atmospheric plasma containing active species, such as oxygen ions and excited oxygen and helium gas molecules, which react with the aforementioned organic substances and combusts them, thus forming carbon monoxide, carbon dioxide, and steam, which are then removed from bonding surface 6. This reaction gas may be removed via a duct 9 provided near substrate 5. A similar effect in removing organic substances, i.e., the ashing effect, can be obtained by using compressed air or a mixed gas containing nitrogen and oxygen as the gas capable of discharge.

A gas containing nitrogen, fluorine compounds ($CF_4$, $C_2F_6$, $SF_6$, etc.), or an organic substance may also be used as the gas capable of discharge to remove oxides from bonding surface 6 of substrate 5. In this case, the aforementioned oxides react with atmospheric plasma containing active species, such as nitrogen ions and excited nitrogen gas molecules, to form, for example, nitrogen oxides; or react with the active species, such as fluorine ions and excited fluorine compound gas molecules, to form fluorides; and may then be removed from bonding surface 6 of substrate 5 by duct 9. When the gas capable of discharge contains an organic substance, oxides on bonding surface 6 may react with the atmospheric plasma containing active species, such as organic substances, carbon, hydrogen ions, and excited organic substance gas molecules which are generated through dissociation, ionization, and excitation of the aforementioned organic substance by the electrical discharge. In this way, hydroxy compounds, oxo compounds, carboxylic acids, carbon dioxide, and steam are formed, which may then be removed from bonding surface 6 of substrate 5 by duct 9.

It is also possible to coat the surface of substrate 5 with an organic substance instead of adding it to the gas capable of discharge. In this case, part of the organic substance coated on the substrate evaporates from exposure to the electrical discharge and the atmospheric plasma generated and is then itself dissociated, ionized, and excited and is then converted into active species such as activated organic substances, carbon, hydrogen ions, and excited organic gas molecules similar to when the organic substance is a component of the gas capable of discharge. Other parts of the organic substance are dissociated, ionized, and excited by direct exposure to the active species of the atmospheric plasma generated by the electrical discharge and are then converted into active species of organic substances, carbon, hydrogen ions, and excited organic gas molecules as above.

These active organic species can offer the same effects as those obtained when an organic substance is directly added to the gas capable of discharge. Furthermore, unlike the chlorine compounds contained in fluxes, these active organic species do not remain on bonding surface 6 of substrate 5.

Examples of gases capable of discharge for obtaining an etching effect for removing oxides from bonding surface 6 of substrate 5 include a gas capable of discharge containing helium or compressed air and carbon tetrafluoride. Naturally, if it is difficult to start electrical discharge using this type of mixed gas, pure helium can be introduced at the start of the electrical discharge for initially generating a stable electrical discharge. Oxygen may also be substituted for compressed air. The inventor has confirmed that the maximum etching effect may be obtained when the volume of the fluorine compound, for example $CF_4$, as a percentage of helium is between 0.5 and 5%, and is ideally 1%; and the volume of oxygen as a percentage of helium is between 0.5 and 5%, and is ideally 1%, in the mixture of gases.

According to another example of the invention, only an inert gas is introduced from gas supply 7 to generate electrical discharge. At the same time, a second gas supply is used to supply reactive gases for example, nitrogen, fluorine compounds, etc. depending on the surface treatment processing purpose desired, to discharge region 8 near substrate 5. In this way, active species of the aforementioned reactive gas are generated by exposure to the electrical discharge and the atmospheric plasma generated, and the desired surface treatment is performed.

As explained above, the bonding method and apparatus of the invention greatly improves the wettability of bonding surface 6 by improving its surface properties before soldering. It also enables high-quality soldering by additionally removing oxides through etching, and easily and thoroughly removes any flux remaining after soldering.

The bonding apparatus and method of this invention may also enhance the effects of the reactive gas or atmospheric plasma containing active species by including water vapor or moisture to the gas capable of discharge or to the discharge region. In particular, the inventor has confirmed that etching speed and efficiency can be significantly improved. For example, the removal of a CuO film from a copper pad surface of a substrate took only about 20 seconds when a gas mixture consisting of helium and carbon tetrafluoride was used with the addition of moisture, such as steam; whereas the same operation had taken about 20 minutes without the addition of moisture.

Figure 17:
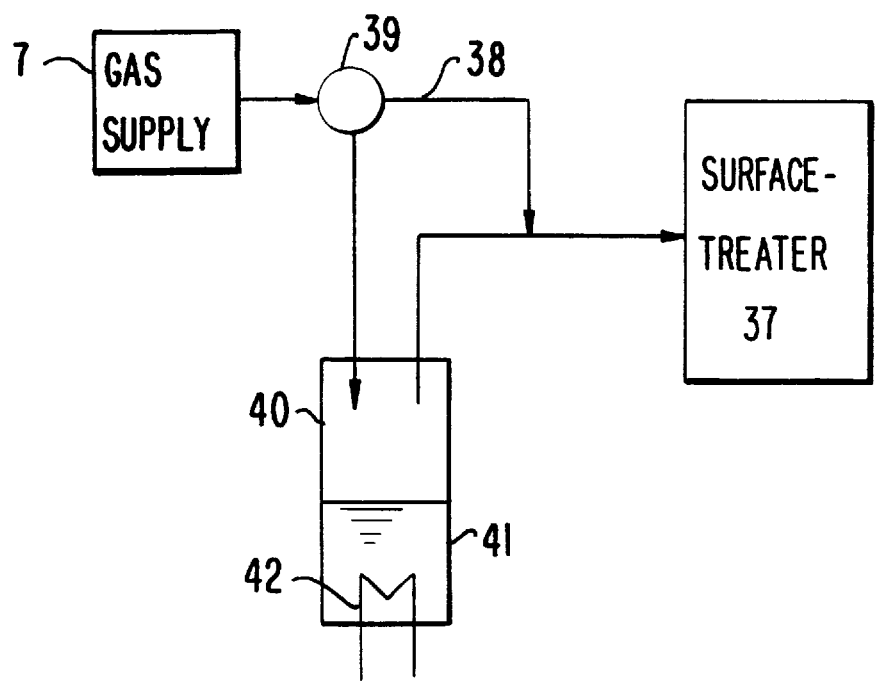
FIG. 17 is a schematic block diagram that shows a configuration of a surface-treatment apparatus, in which moisture is supplied through its addition to the gas capable of discharge prior to electrical discharge.

FIGS. 17 through 19 schematically show specific embodiments for adding moisture to the reactive gas flow in order to enhance the effects of the electrical discharge surface treatment of the bonding method and apparatus of the invention. In the embodiment shown in FIG. 17, a bypass is provided in the middle of a pipe 38, used for supplying the gas capable of discharge from gas supply 7 to a surface-treater 37 which may be any of the surface-treaters described herein. Part of the gas capable of discharge is fed into a tank 40 after being regulated by a valve 39. Tank 40 contains water 41, ideally purified water, which may be heated by a heater 42 and turned into steam. The gas introduced into tank 40 returns to pipe 38 after absorbing and mixing with the steam, and then mixes with the gas directly supplied from gas supply 7, before being fed to surface-treater 37.

The addition of moisture directly to the gas capable of discharge fed to surface-treater 37 is beneficial because it eliminates the risk of dew condensation from the moisture on the substrate (now shown). The amount of moisture may be adjusted by controlling valve 39, and by controlling the temperature of water 41 in tank 40 through the use of the heater 42.

In another embodiment, shown in FIG. 18, an atomizer 43, is installed in the middle of pipe 38 which connects gas supply 7 to the surface-treater (not shown). Water 41 is supplied to atomizer 43 from tank 40. This configuration enables the addition of moisture to the gas capable of discharge to be fed to the surface-treater. In this case, it is possible to promote the atomization of water by supplying warm water to atomizer 43 by installing a heater similar to that used in the embodiment shown in FIG. 17 in tank 40. It is also possible to install an air blower and a pipe separately from gas supply device 7 and pipe 38, in order to directly force the water atomized by atomizer 43 into the surface-treater, for example, the chamber formed by metal cover 3 described in the embodiment shown in FIGS. 1 and 2, or directly to the area near the bonding surface of the substrate and in the reactive gas flow.

In still another embodiment, shown in FIG. 19, steam is generated by heating water 41 in tank 40 with heater 42. The water vapor is then directly supplied, via a steam pipe 44, to a bonding surface (not shown) of substrate 5 and in the reactive gas flow where reactions with atmospheric plasma will then take place. In this case, the risk does exist that dew condensation will occur on the bonding surface of substrate 5, if substrate 5 is kept at a relatively low temperature. If it is considered that dew condensation may adversely affect substrate 5, it is possible to connect steam pipe 44 to the aforementioned surface-treater or to the middle of pipe 38 as in either of the embodiments shown in FIGS. 17 and 18, so that moisture is added to the aforementioned gas capable of discharge before the electrical discharge occurs.

If the solder used on the bonding surface of substrate 5 for bonding components has been oxidized, for example, by heating, the oxide can be removed by applying a similar electrical discharge surface treatment to the surface of the solder, thus ensuring good soldering results. It is also recommended that electrical discharge surface treatment be applied to individual components (not shown) that have been oxidized prior to bonding.

Furthermore, according to the method and apparatus of the invention, bonding surface 6 of substrate 5 or individual components (not shown), to which electrical discharge surface treatment is applied before soldering, need not consist of a metal, for example copper. The inventor has confirmed that the invention also facilities the removal of oxides from materials such as glass or Indium Tin Oxide (ITO), again resulting in high-quality soldering.

For example, it was confirmed that excellent wettability and adhesion of solder to glass materials can be achieved, without the use of any flux, by using nitrogen alone as the gas capable of discharge. Therefore, it becomes possible to directly assemble components, for example, IC chips to a glass surface of a liquid crystal panel, without the necessity of forming a precoat on the surface in advance and then bonding the components via a TAB substrate.

Naturally, metal cover 3 is not an absolute requirement for electrical discharge to occur. Furthermore, cover 3 can be made of ceramic material instead of metal.

Figure 2:
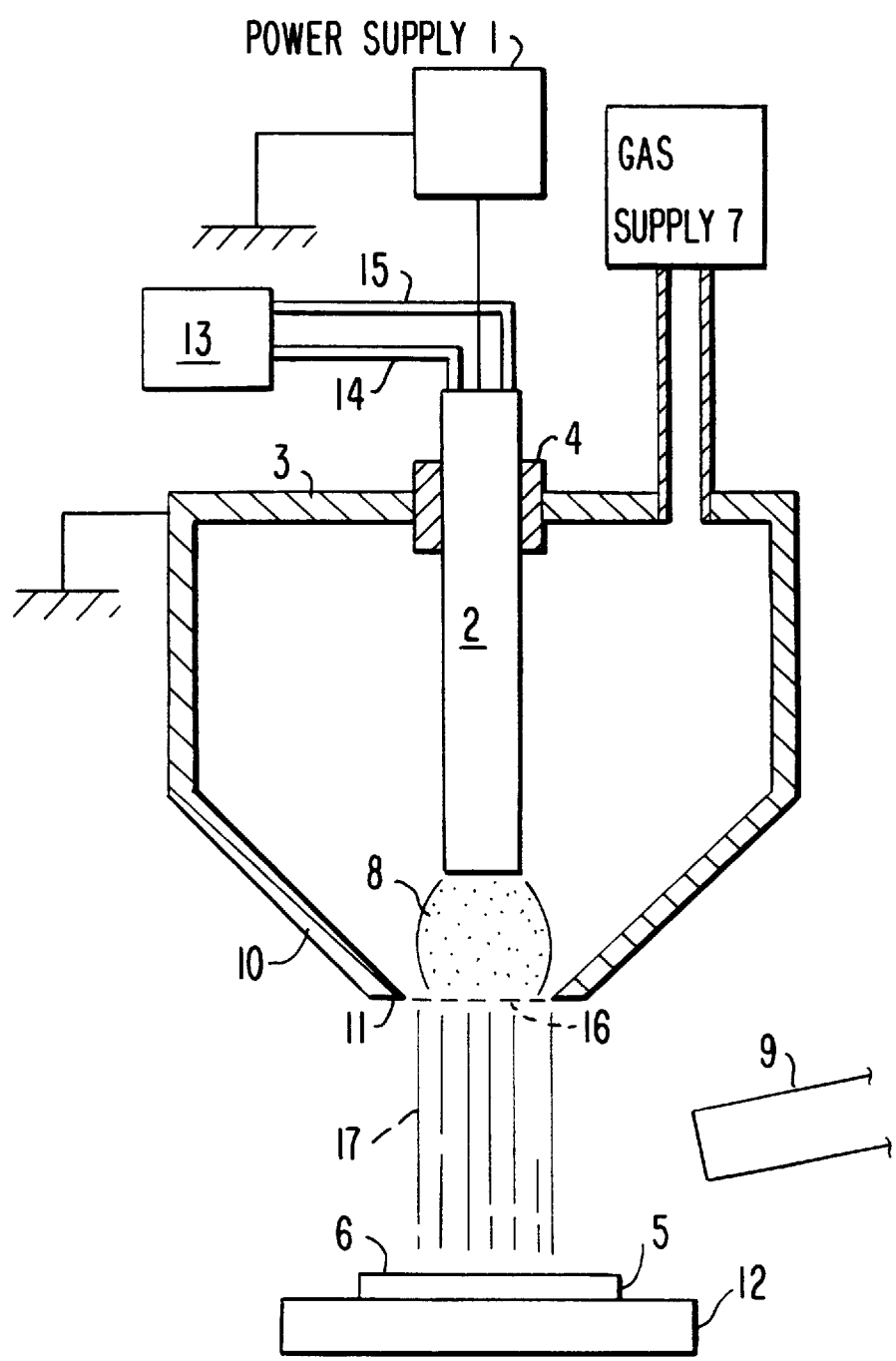
FIG. 2 is a schematic diagram showing another embodiment of a surface-treatment apparatus in accordance with the invention.

FIG. 2 shows another embodiment of a surface-treater of the invention. In this example, a grounded electrode corresponding to power supply electrode 2 has been separately installed, instead of using substrate 5 as the grounded electrode, as is the case of the embodiment shown in FIG. 1. That is, the bottom of metal cover 3 is extended to a position near the tip of electrode 2, so that electrode 2, rather than protruding, is completely encased inside metal cover 3, and this extended portion of metal cover 3 is used as the grounded electrode 10 for generating electrical discharge. Substrate 5 is then positioned on a holder 12, which may possess either a heating or cooling function (not shown), adjacent the opening 11 formed by grounded electrode 10 on metal cover 3. Furthermore, cooling water may be circulated from a cooling device 13 via pipes 14 and 15 to electrode 2, to cool electrode 2 and prevent it from overheating as a result of electrical discharge treatment over an extended period of time. Additionally, a metal mesh 16 may be installed at the opening of metal cover 3.

As in the embodiment shown in FIG. 1, the gas capable of discharge is supplied from gas supply 7, and the gas replaces the ambient atmosphere inside metal cover 3. When high-frequency voltage is applied from power supply 1 to electrode 2, gas discharge occurs between the tip of electrode 2 and grounded electrode 10. Since the aforementioned gas capable of discharge is continuously being supplied from gas supply 7, when the gas passes through discharge region 8, part of this gas is converted to atmospheric plasma containing active species, such as ions and excited gas molecules, and jets out as a reactive gas flow 17, through bottom opening 11 of metal cover 3. The property of bonding surface 6 of substrate 5 is modified through ashing or etching, depending on the type of gas supplied from gas supply 7, and thus, by the aforementioned atmospheric plasma containing active species contained in reactive gas flow 17.

In another example, as in the embodiment shown in FIG. 1, only an inert gas, for example helium or argon, is introduced from gas supply device 7 for initially generating stable electrical discharge, while a second gas supply (not shown) is used to supply a reactive gas, such as nitrogen or a fluorine compound, depending on the processing purpose, to the vicinity of substrate 5. Reactive gas active species are generated through the energy exchange between, for example, helium radicals that are generated by the aforementioned electrical discharge and that jet out through bottom opening 11, and the aforementioned reactive gas. Reactive gas active species are then used for the desired surface treatment.

Because this working example uses a configuration in which bonding surface 6 of substrate 5 is not exposed directly to electrical discharge, and is instead exposed to reactive gas flow 17, the processing effectiveness becomes slightly less than in the embodiment shown in FIG. 1, due to the short life spans of the ions. Naturally, this trend becomes more pronounced as the distance between substrate 5 and bottom opening 11 of metal cover 3 increases.

On the other hand, however, if the ions have adverse effects on substrate 5, metal mesh 16 installed at bottom opening 11 may be used to remove the ions from reactive gas flow 17, by trapping and neutralizing the ions contained in reactive gas flow 17. Consequently, bonding surface 6 of substrate 5 is treated by atmospheric plasma that does not contain ions.

Depending on the conditions, substrate 5 may be heated to temperatures above 200° C. by the electrical discharge itself or by the heat radiated from electrode 2. Therefore, if it is necessary to protect substrate 5 against heat, holder 12 can be used to cool substrate 5 during the processing. On the other hand, if it is not necessary to protect substrate 5 against heat, it should be actively heated in order to speed the reaction rate. Because the chemical reaction is a type of reduction reaction, heating usually accelerates the reactions. Furthermore, surface treatment and soldering can be simultaneously achieved by applying the electrical discharge surface treatment of the invention while heating substrate 5, on which the solder and components have been placed, to a temperature above the melting point of the solder.

A light source, such as a halogen lamp (not shown), may also be used as a heating device. This method minimizes time loss by quickly heating bonding surface 6, and also makes it easy to heat substrate 5 even if it has a complicated shape with severe irregularities. It is also possible to use a short-wave light (not shown), for example, ultraviolet light, from a light source. This method enhances, for example, rinsing performance, because the ultraviolet light severs the chemical bonds of organic substances facilitating ashing, in addition to providing the aforementioned heating effect.

As a supplementary method, a blower can be used to blast the atmospheric plasma or reactive gas flow 17 against substrate 5. This allows removal of organic substances from bonding surface 6, while the aforementioned gas can additionally blast off the inorganic impurities that are covered by, or adhered to, these organic substances. These effects can also be achieved by increasing the flow of the gas capable of discharge supplied to the chamber formed from metal cover 3, rather than installing a separate blower. Furthermore, the gas flow from the aforementioned blower can also be used as either a cooling or heating means, by separately controlling its temperature. Depending on the conditions, if there is a risk of dew adhesion to electrode 2, it is possible to use an appropriate heater (not shown) to heat the area around electrode 2 and metal cover 3.

Figure 3:
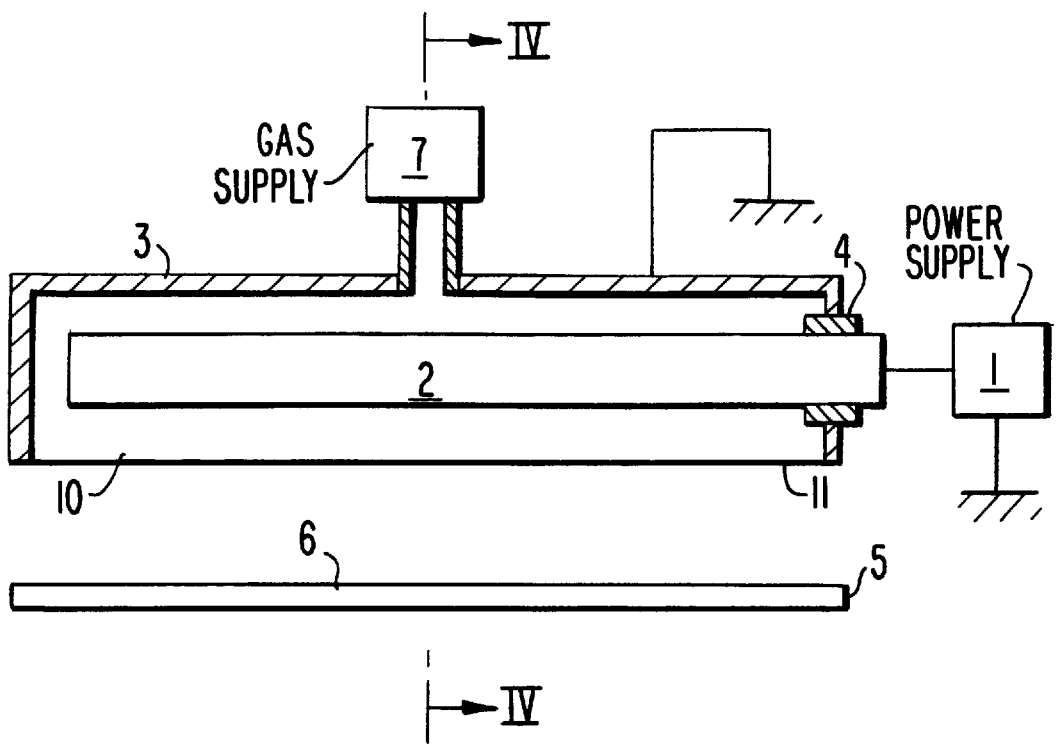
FIG. 3 is a schematic diagram showing still another embodiment of a surface-treatment and apparatus in accordance with the invention.
Figure 4:
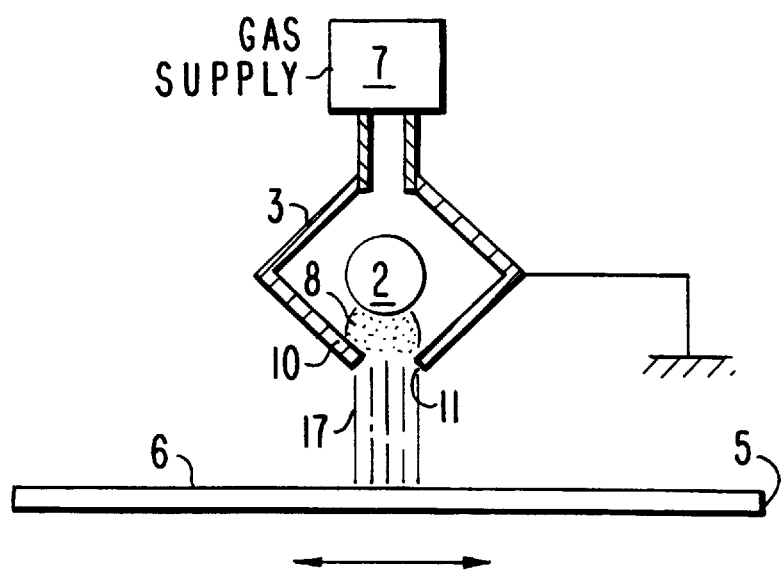
FIG. 4 is a cross-sectional view of the embodiment shown in FIG. 3 taken along line IV—IV of FIG. 3.

FIGS. 3 and 4 show still another embodiment of the invention, which is a modification of the embodiment shown in FIG. 2. As in the prior embodiments discussed above, a long, thin, bar-shaped electrode 2 for electrical discharge generation is held within metal cover 3 by insulator 4.

Metal cover 3 is shaped like a long box with a roughly square cross section, and its length slightly exceeds that of electrode 2. It is positioned so that its diagonal lines are in the vertical and horizontal directions. Furthermore, the bottom corner of the aforementioned square is cut out over the entire length at a specified width, thus forming long opening 11 which allows reactive gas flow 17 to jet out of metal cover 3. The edges of cover 3 form grounded electrode 10 and opening 11 along length of cover 3, similar to the embodiment shown in FIG. 2. Naturally, it is possible to design the structure so that electrical discharge is generated between electrode 2 and grounded substrate 5, as in the embodiment shown in FIG. 1, by making electrode 2 protrude out of metal cover 3 by, for example, increasing the width of opening 11 of metal cover 3, or by removing metal cover 3 altogether.

Similar to the above embodiments, by supplying a gas capable of discharge from gas supply 7, the ambient atmosphere in the vicinity of electrode 2, and substrate 5 is replaced by the gas capable of discharge. Then, when high-frequency voltage is applied from power supply 1 to electrode 2, gas discharge occurs along and between the entire length of electrode 2 and grounded electrode 10 of metal cover 3. The atmospheric plasma containing active species of the aforementioned gas capable of discharge generated by the electrical discharge, jets out through opening 11 over substantially all its entire length as reactive gas flow 17. In this way, bonding surface 6 of substrate 5 is exposed to the aforementioned atmospheric plasma containing active species linearly along the length of electrode 2. During this exposure, by moving either or both the aforementioned surface-treater or substrate 5 width-wise relative to electrode 2, or in some cases also lengthwise, it becomes possible to surface treat the entire bonding surface 6 of substrate 5, even if it is large.

Drawings 5(A) and 5(B) show modified examples of the structure of electrode 2 and metal cover 3 in the embodiments described above. In both of these examples, electrode 2 for electrical discharge generation is enclosed inside metal cover 3 that forms an internal chamber 18 with an inverted T shape cross section. Furthermore, numerous gas jet ports 20 are spaced on surface 19 of metal cover 3, in both the lengthwise and widthwise directions.

Figure 5A:
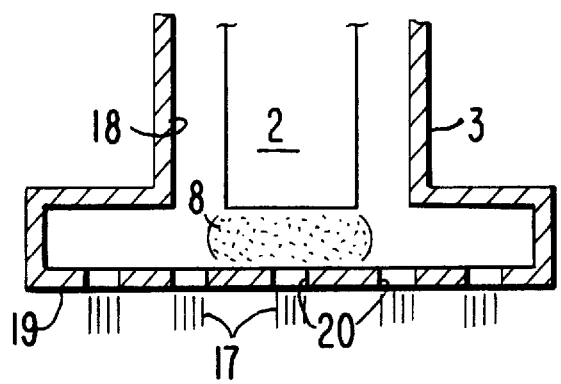
FIG. 5(A) is an oblique cross-sectional of a nozzle used in the surface-treatment apparatus of the embodiment shown in FIG. 2.
Figure 5B:
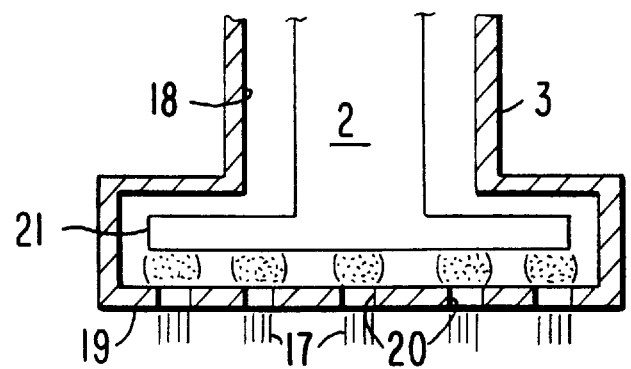
FIG. 5(B) is an oblique cross-sectional view of a different nozzle which may be used in the surface-treatment apparatus of the embodiment shown in FIG. 2.

In the example shown in FIG. 5(A), electrical discharge occurs only between electrode 2 and the center area of surface 19 of metal cover 3 positioned immediately adjacent electrode 2, because electrode 2 is shaped like a plate with an I-shaped cross section and extends along the length of metal cover 3. Consequently, reactive gas flow 17 jets out mostly through those jetting ports 20 located near the center. In contrast, in the example in FIG. 5(B), electrode 2 possesses an inverted T shape cross section that matches the shape of internal chamber 18 of metal cover 3. Consequently, electrical discharge occurs between the area 21, which extends in a flange-like fashion along the width of electrode 2, and corresponding surface 19 of metal cover 3, over nearly its entire surface. Therefore, reactive gas flow 17 jets out through almost all of jetting ports 20. As can be seen, the locations for generating electrical discharge, the number of locations, and the gas jetting ports, etc. can be adjusted freely and appropriately based on the usage conditions and the material to be treated. Furthermore, because this type of configuration can increase the size of two surface treatment area, it is possible to simultaneously process a large number of substrate at once. Additionally, the structures of metal cover 3 and electrode 2 shown in FIGS. 5(A) and 5(B) can also be applied to the structures shown in the embodiments of FIGS. 1 and 2.

Figure 6:
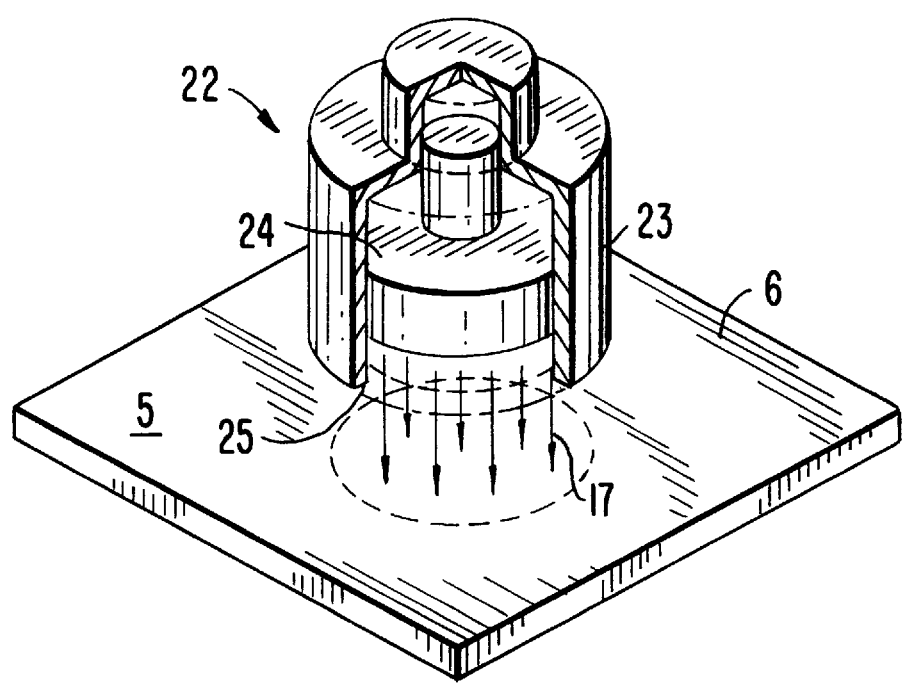
FIG. 6 is a partial oblique cross-sectional view of an atmospheric plasma gun-type surface-treatment apparatus in accordance with the invention.

FIG. 6 shows an overview of a so-called "gun-type" surface-treater 22 that is used for locally applying surface treatment of atmospheric-plasma generated by electrical discharge to materials to be processed, such as a substrate, as required on the shop floor or local manufacturing site where soldering is performed. Surface-treater 22 possesses a gun type structure, which may be held by an operator as needed. A discharge generating portion 24 is held within a cylindrical nozzle 23 that possesses an opening at its tip. The basic structure of discharge generating portion 24 is similar to the structure of the embodiment shown in FIG. 2 and is connected to a gas supply (not shown) and a power supply (not shown), as in the above-mentioned embodiment. In this structure, a reactive gas flow of atmospheric plasma containing active species generated by the electrical discharge is guided by tip opening 25 of nozzle 23 to jet out toward bonding surface 6 of substrate 5, from the open area of discharge generating portion 24.

Figure 7A:
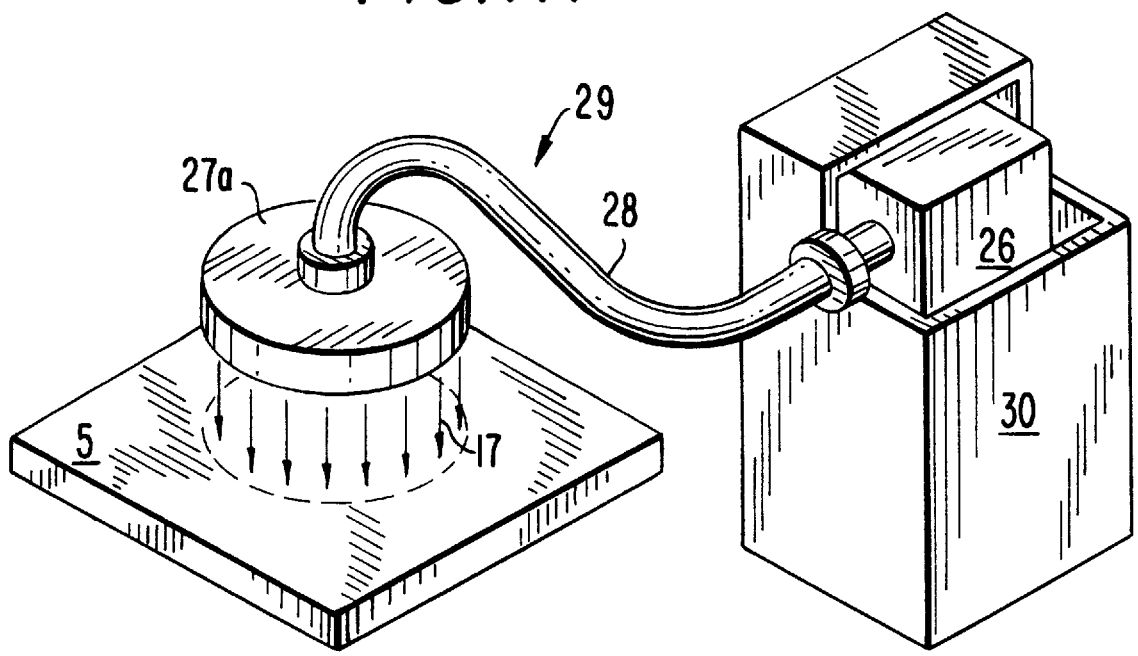
FIG. 7(A) is a partial oblique cross-sectional view of a surface-treatment apparatus in which the electrical discharge generating portion and the nozzle portion are separated.

FIG. 7(A) shows a surface-treater 29, in which the electrical discharge generating portion 26 and the nozzle 27a, used for jetting out reactive gas flow 17, are provided separately and connected via a flexible tube 28. The electrical discharge generating portion 26 is housed inside a main unit 30 which can be either a fixed type that integrates a power supply and a gas supply etc. (not shown in drawing), or a mobile type. Reactive gas flow 17 of atmospheric plasma generated by electrical discharge is supplied to nozzle 27a via flexible tube 28 and is jetted out toward substrate 5 through nozzle 27a. In order to effectively deliver the atmospheric plasma containing active species to substrate 5, the length of flexible tube 28 should be a maximum of about 5 m, and ideally around 2 m. Having nozzle 27a as a separate unit improves productivity, and also allows the processing capacity of surface-treater 29 to be increased as needed.

Figure 7B:
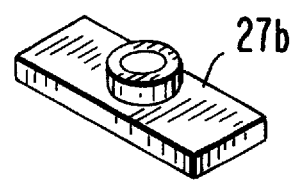
FIG. 7(B) depicts another nozzle portion of the surface-treatment apparatus of the embodiment shown in FIG. 7(A)

The nozzle 27a installed at the tip of flexible tube 28 may be removable. FIG. 7(B) shows a nozzle 27b of a different embodiment which is removable and replaceable on tube 28. While nozzle 27a in FIG. 7(A) consists of a relatively large disk which is capable of processing a large area at one time, the nozzle area 27b in Drawing 7B is rectangular in shape and is suitable for processing relatively small and fine areas. This ability to change nozzles enables surface-treater 29 to adapt to changes in the material to be surface treated and to usage conditions, thus enhancing operational flexibility and overall productivity.

Figure 8:
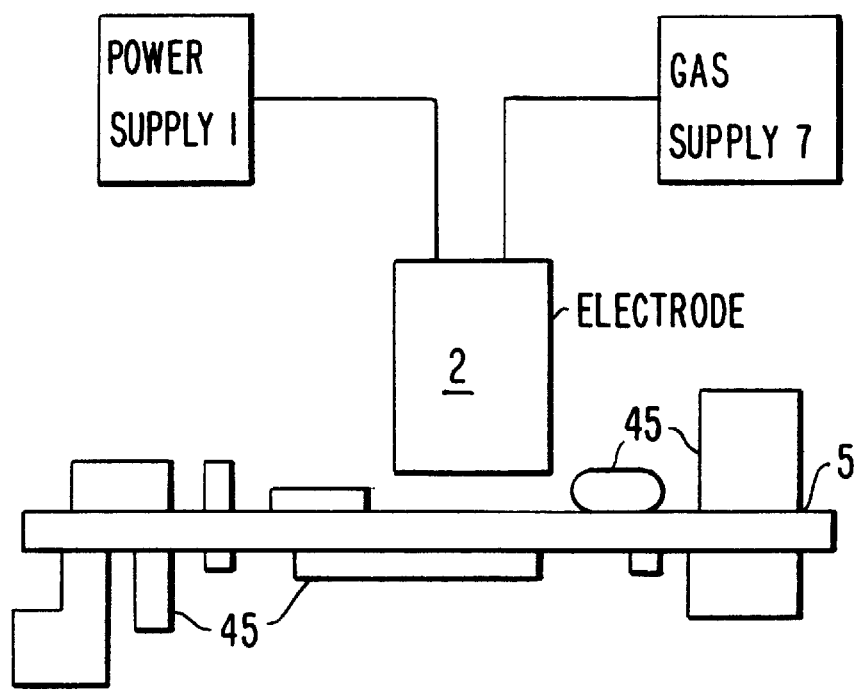
FIG. 8 is a schematic block diagram that depicts a surface-treatment apparatus which is used to selectively treat certain selected portions of the surface of a substrate.

Use of the surface-treaters of the bonding method and apparatus of the invention makes it possible to selectively surface treat bonding surface 6 of substrate 5 to be treated by changing the shape of the high-frequency electrode used for generating electrical discharge, rather than employing a masking method. For example, as shown in FIG. 8, when many electronic or other components 45 have been mounted on both sides of substrate 5, and when it is necessary to solder a new component onto bonding surface 6, the tip shape of electrode 2 can be changed to match the position, shape, and range of the surfaces to be soldered. For example, if the aforementioned new component is a square-shaped IC with leads on all four sides, a hollow square shape can be used for the electrode tip. Although the shape accuracy, i.e., the ratio between the shape of the electrode and the shape of the surface actually treated, will vary depending on the voltage applied to the electrode, the distance between bonding surface 6, and the flow rate of the gas used, etc., the actual surface treatment has been performed by the inventors with an accuracy of 2 to 3 mm. Furthermore, if substrate 5 to be surface treated is not an insulating material, such as a metal or glass substrate, the accuracy can be improved by placing a grounded electrode (not shown) below bonding surface 6 of substrate 5 and matching the shape of this grounded electrode to the shape of the area to be surface treated. In this way, it is possible to improve wettability, or to perform ashing, or etching, etc., while protecting other components on substrate 5 against the effects of the electrical discharge or reactive gas flow 17.

So far, the methods and apparatus of surface treating the surface of a substrate to be bonded have been explained. By integrating these surface-treaters with soldering machines, it is possible to produce better soldering results, and to improve overall productivity through more efficient soldering operations and automation. Furthermore, the fact that excellent soldering results can uniformly and efficiently be obtained, even for small and find areas, the apparatus and method of the invention offers the benefit of a high degree of freedom in designing circuit boards and wiring patterns. Soldering methods and apparatuses involving surface treatment by the surface-treaters described above are explained below in detail.

Figure 9:
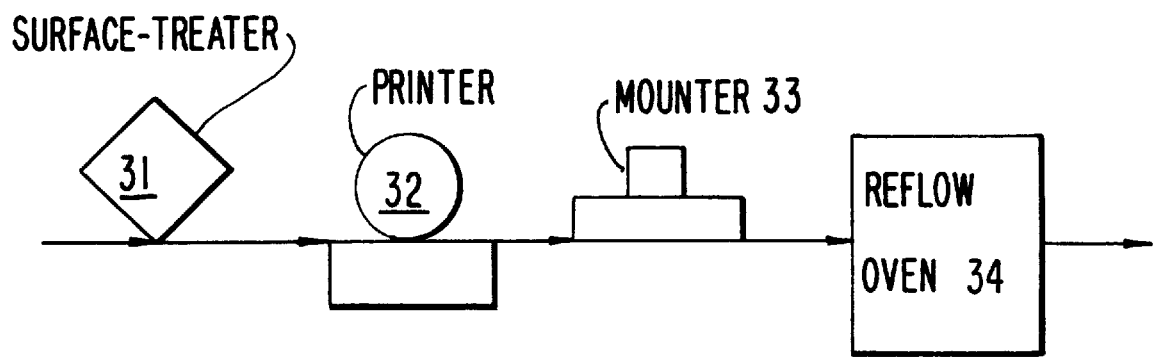
FIGS. 9 through 14 are schematic block diagrams that depict the soldering method and apparatus of the invention, and show working examples of different configurations for bonding components to a substrate.
Figure 10:
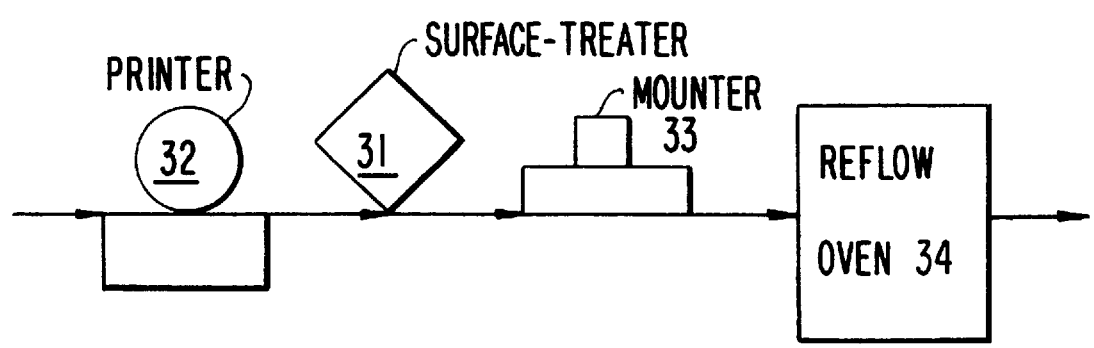

FIG. 9 shows a block diagram of the configuration of an example of a substrate soldering and bonding apparatus of the invention. A solder paste printer 32, a mounter 33, and a reflow oven 34 are positioned in series on the downstream side of surface-treater 31. First, after surface treatment is applied to the substrate by surface-treater 31, solder paste printer 32 prints a pattern of paste solder on the surface treated substrate. Next, mounter 33 mounts components, and finally, soldering is completed through heating using reflow oven 34. Application of surface treatment to the substrate by surface-treater 31 at the start, as described above, improves the wettability of the substrate to solder paste. Thus, excellent soldering results can be obtained even if the amount of flux contained in the solder paste is small or nonexistent as in non-flux solders with inherently bad wettability.

Based on the example of the embodiment shown in FIG. 9, experiments were conducted using glass substrate with ITO wiring, and glass epoxy substrate with copper wiring. The results are shown in Table 1. The following gases capable of discharge were used for surface-treater 31: helium as an inert gas; oxygen, air, and mixture of air and an inert rare gas as oxidizing gases; and propane, and a mixture of propane and an inert gas as reducing gases. Additionally, an experiment was also conducted in which an n-hexane coating was applied as an organic substance on the substrate prior to surface treatment by surface treater 31. In these experiments, a 13.56 MHz high-frequency power supply was used for generating electrical discharge at atmospheric pressure.

TABLE 1

| Pretreatment | Gas type (Electrical Discharge) | Power used (13.56 MHz) | Results Glass epoxy | ITO Glass |
|---|---|---|---|---|
| None | He | 30 W | B | B |
| | C3H8 | 100 W | A | A |
| | He + C3H8 | 30 W | A | A |
| | He + Air + C3H8 | 30 W | A | A |
| | Air + C3H8 | 100 W | A | A |
| | O2 | 30 W | C | C |
| | Air | 100 W | C | C |
| | He + Air | 30 W | C | C |
| n-hexane coating | He | 30 W | C | C |
| | C3H8 | 100 W | A | A |
| | He + C3H8 | 30 W | A | A |
| | He + Air + C3H8 | 30 W | A | A |
| | Air + C3H8 | 30 W | A | A |
| | O2 | 30 W | A | A |
| | Air | 100 W | A | A |
| | He + Air | 30 W | A | A |

The results were judged according to the following three categories:
A: Good solderability
B: No change after treatment
C: Solderability deteriorated after treatment The above results indicate that solderability improved in both glass substrate with ITO wiring and glass epoxy substrate with copper wiring, when a gas containing a reducing gas which contained an organic substance was used, and/or when the substrate was coated with an organic substance for providing the reducing gas before surface treatment. Similar results were also obtained when 400 KHz and 10 KHz power supplies were used. In other words, even if no reducing gas is supplied from outside, solderability can be improved as long as a source of reducing gas exists on the surface to be treated. Furthermore, electrical discharge selectively occurs between the electrode and the areas of the substrate where conductive materials are present. Therefore, in the case of the aforementioned glass substrate, electrical discharge selectively occurs between the electrode and the ITO wiring area, and between the electrode and the copper wiring area in the case of the epoxy substrate, resulting in surface treatment in both cases of just the conductive wire elements. Consequently, since surface treatment does not occur in areas other than the above-mentioned wiring areas, it is not necessary to protect these other areas against damage, using, for example, masks.

FIGS. 10 through 14 show other examples of the soldering apparatus of this invention. In the example shown in FIG. 10, surface-treater 31 is positioned between paste solder printer 32 and mounter 33. After paste solder is printed on the substrate by paste solder printer 32, surface treatment is applied to the substrate by surface-treater 31. Next, the components are mounted by mounter 33, and finally, soldering is completed through heating using reflow oven 34.

Figure 11:
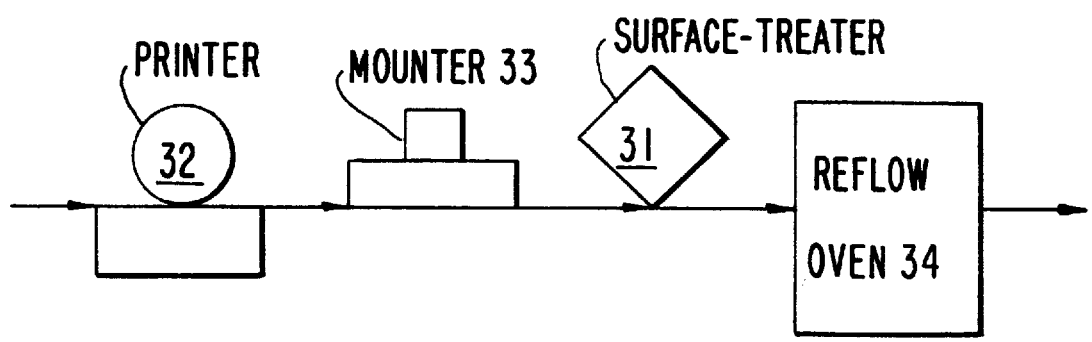

In the example shown in FIG. 11, surface-treater 31 is positioned between mounter 33 and reflow oven 34. After paste solder is printed on the substrate by paste solder printer 32, the components are mounted by mounter 33. Next, surface treatment is applied to the substrate by surface-treater 31, and finally, soldering is completed by reflow oven 34.

Figure 12:
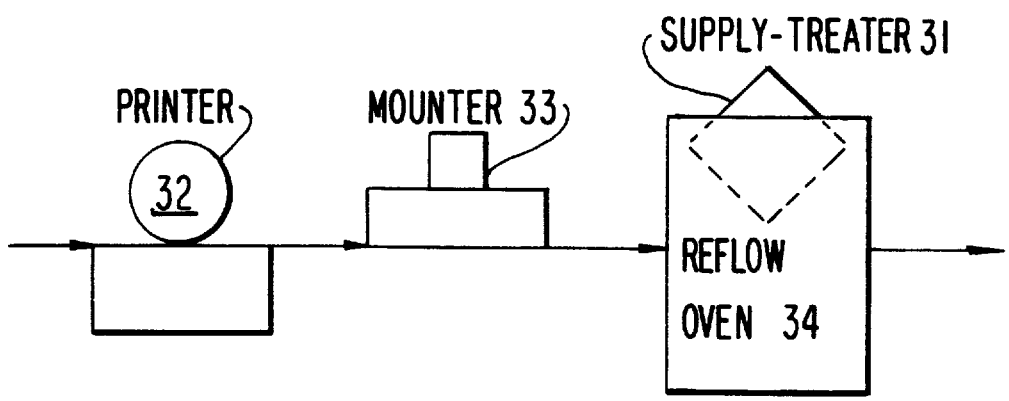

In the example shown in FIG. 12, surface-treater 31 and reflow oven 34 are integrated as one unit. After paste solder is printed on the substrate by paste solder printer 32, the components are mounted by the mounter 33. Next, surface treatment is applied to the substrate by the surface-treater 31, and the surface treatment continues during heating with reflow oven 34, to complete soldering.

Figure 13:
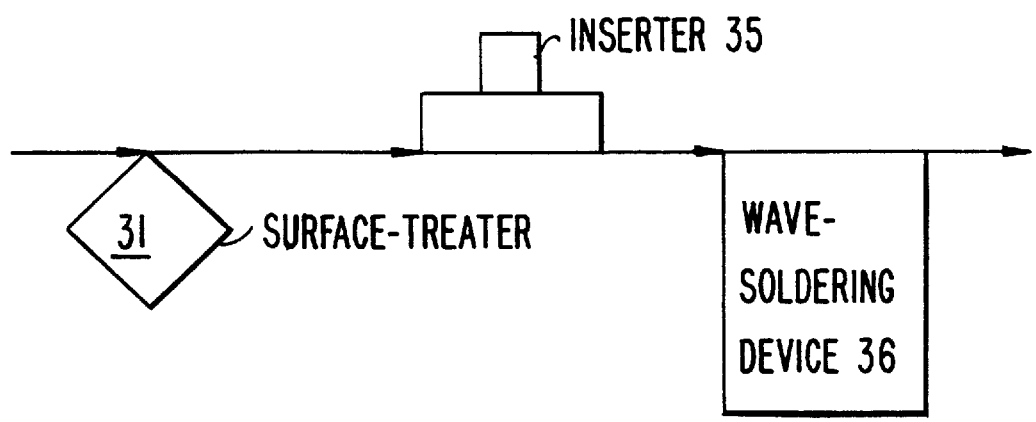

The example shown in FIG. 13 is a device for wave-soldering components onto a substrate, and includes an inserter 35 and a wave-soldering device 36 which are positioned on the downstream side of surface-treater 31. After surface treatment is applied to the substrate by surface-treater 31, the components are inserted by inserter 35, and then soldering is completed using wave-soldering device 36. This method makes soldering possible even if the amount of flux is very small or nonexistent.

Figure 14:
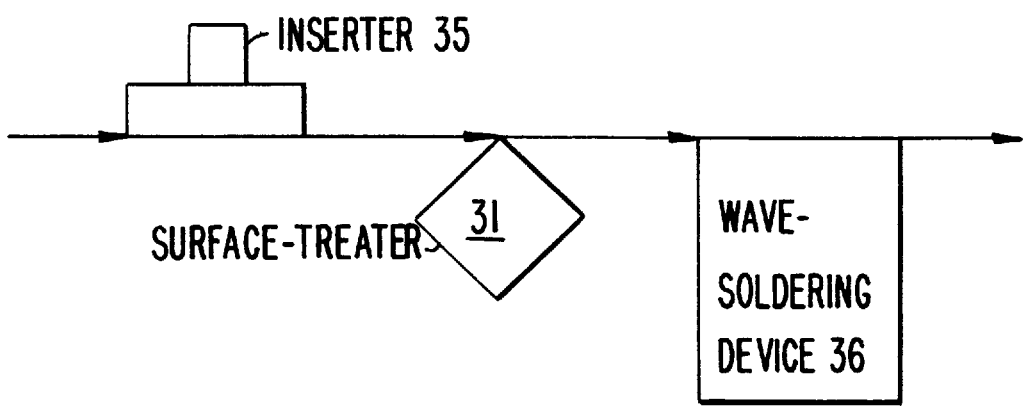

FIG. 14 shows a modified version of the example in FIG. 13. Surface-treater 31 is positioned between inserter 35 and wave-soldering device 36. In this configuration, after the components are mounted by inserter 35, surface treatment is applied to the substrate by surface-treater 31, and then soldering is completed using wave-soldering device 36. This method also makes soldering possible even if the amount of flux is very small or nonexistent.

Next, an explanation is provided for a method of assembling mixed types of electronic components onto a substrate by using the bonding apparatus and method of the invention, along with both SMT (Surface Mount Technology) and COB (Chip On Board) technology. Usually in SMT mounting, a reflow oven is used for heating and soldering after the components are mounted. Therefore, the conventional practice is to first assemble bare chips and components using a COB mounting method, followed by SMT mounting, in order to prevent splashing flux, etc. from contaminating the bonding surface of the substrate, or to prevent the formation of oxide films. In contrast, the invention makes it possible to perform SMT mounting first, followed by COB mounting.

Figure 15:
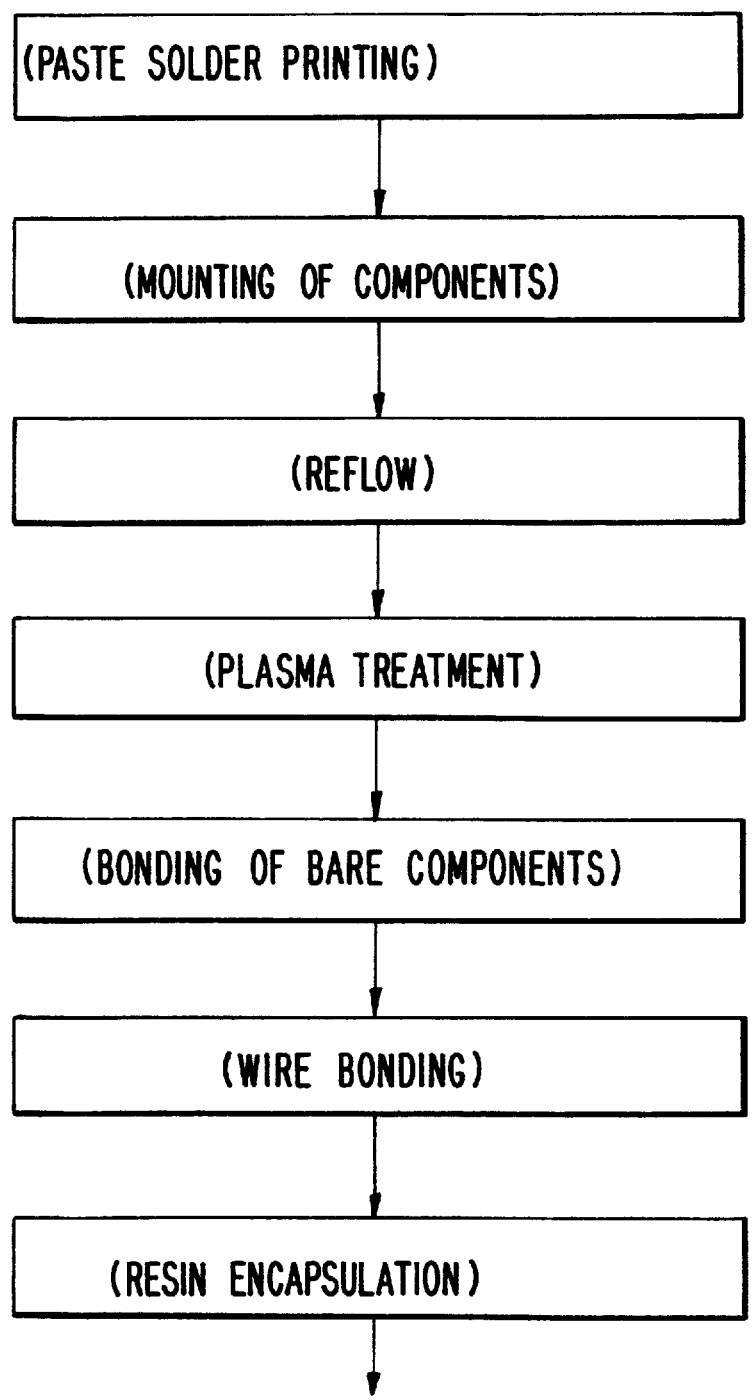
FIG. 15 is a flow diagram that shows a process that uses the bonding method and the device of the invention, in which both Substrate Mount Technology (SMT) and Chip on Board (COB) methods are employed for mixed, double-sided mounting of components on a substrate.

As shown in the flow chart of FIG. 15, paste solder is first printed on specific locations on a substrate surface, and then, after mounting all surface-mount components, except for the bare chips to be COB-assembled, a reflow oven is used for heating and soldering. Next, the flux adhered to the pad surfaces to be used for wire bonding, and the oxide films formed during heating steps are easily removed by using the surface-treaters of the invention to apply surface treatment to the surface of the aforementioned substrate. Afterwards, bare chips are glued to their mounting locations on the substrate, bonded through wire bonding, and their surface is sealed with a resin for completion of a chip package. Furthermore, the invention makes it possible to treat only the selected locations on the substrate with accuracy of about 2 to 3 mm; and in particular, highly selective and effective treatment can be applied to only the metal pads, between which electrical discharge tends to occur due to their conductive nature.

When the wet method described earlier is used for rinsing and removing organic substances, there is a risk that the rinsing agent will adversely affect the electronic components on the substrate. On the other hand, ashing at low pressure has the problem of the additional time required in bringing the substrate to a low pressure atmosphere and may be ineffective in treating highly irregular areas or removing high molecular weight organic substance. If COB mounting is performed first as in conventional methods, surface-mount components cannot be positioned near the bare chips that have been resin-molded, because of the resulting difficulty in applying paste solder to those areas containing resin. Furthermore, the paste solder printing mask used for SMT mounting must be equipped with escape holes for the resin mold of the COB mounting, thus resulting in higher mask production cost. Additionally, if the substrate is thin, it tends to warp after COB mounting, making subsequent SMT mounting difficult. The bonding method and apparatus of the invention, on the other hand, solves these problems, in that it produces higher-quality soldering, increases the degree of freedom in designing circuit boards, enables the soldering of smaller-size substrate, and facilitates higher-density assemblies.

Figure 16:
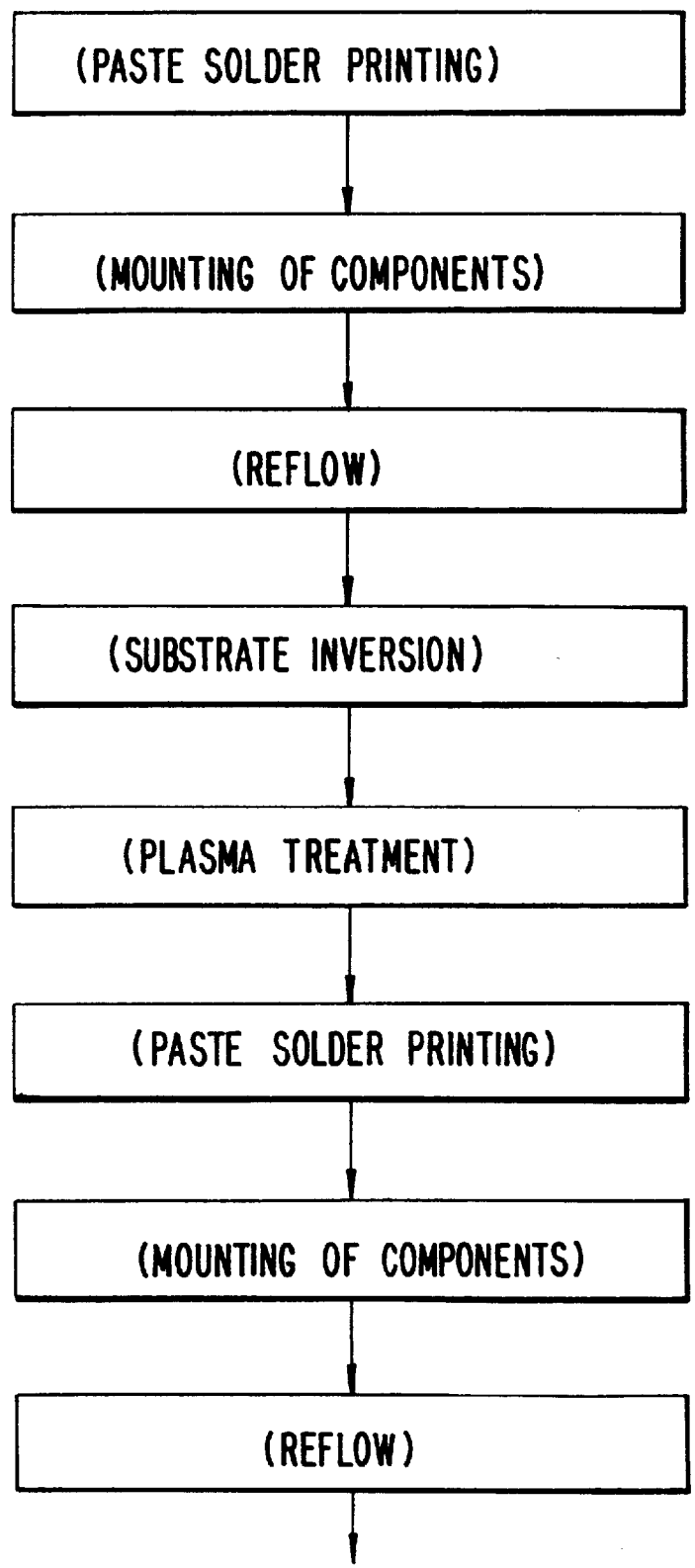
FIG. 16 is a flow diagram that shows a process in which the bonding method and apparatus of the invention are used for mounting components on both sides of a substrate.

FIG. 16 shows a flow diagram of a process in which components are mounted on both sides of a substrate through soldering. First, a paste solder printer is used to print paste solder on one side of the substrate, then after the components are placed on the substrate, they are passed through a reflow oven to complete the soldering on this side. Next, the substrate is turned over so that the other side faces up, surface treatment using atmospheric plasma generated by electrical discharge by the surface-treaters of the invention is applied. Then, as in normal assembly operations, the paste solder is printed, the components are placed, and finally the mounting of components on both sides of the aforementioned substrate is completed by heating the substrate and components in a reflow oven.

In this type of substrate with double-sided mounting, the heat treatment used for soldering on one side oxidizes the copper pads, electrodes, etc. on the other side. However, by using atmospheric plasma generated by electrical discharge as a treatment to remove the oxide film, conductivity and wettability can be recovered to a level equivalent to that before heat-induced oxidation, and thus good soldering may be achieved on the second side. Additionally, because the electrical discharge treatment of the invention can be applied to either the top or bottom side of a substrate, regardless of its orientation, it is also possible to apply it to the remaining side before inverting the substrate, after reflow and soldering are completed on the other side. Furthermore, even better soldering results can be achieved by applying electrical discharge treatment to one of the sides before paste solder is printed on it, and to the components to be mounted.

The invention has been explained above in detail with references to appropriate working examples, but the invention can be implemented in many other ways by making various changes or modifications to the above examples within its technical scope. For example, the electrode for generating electrical discharge is not limited to the bar and plate shapes, and can be shaped as a sphere or a non-spherical curved shape, etc. These shapes enable the generation of the type of electrical discharge that best suits the processing conditions.

It will thus be seen that the objects set forth above, among those made apparent from the preceding description, are efficiently attained, and, since certain changes may be made in carrying out the above process and in the constructions set forth without departing from the spirit and scope of the invention, it is intended that all matter contained in the above description and shown in the accompanying figures shall be interpreted illustrative and not in a limiting sense.

It is also to be understood that the following claims are intended to cover all of the generic and specific features of the invention herein described, and all statements of the scope of the invention which, as a matter of language, might be said to fall there between.

We claim:

1. A method of bonding components together using a brazing material, comprising the steps of:

providing a gas capable of discharge;

generating discharge in said gas capable of discharge at or about atmospheric pressure thereby creating an atmospheric plasma having active species;

exposing at least a portion of at least a first component to said atmospheric plasma having active species thereby surface treating said portion; and bonding said first component to a second component using a brazing material.

2. The method of claim 1 wherein the gas capable of discharge contains at least an organic substance.

3. The method of claim 1 further comprising the step of:

coating at least one of the portion of said first component and said second component with an organic substance prior to exposing said coated portion to the atmospheric plasma.

4. The method of claim 1 wherein exposing the portion to the atmospheric plasma is performed at least one of before, during, and after said bonding step.

5. The method of claim 1 wherein the surface of one of said first and second components is selectively exposed to said active species.

6. The method of claim 3 wherein the surface of one of said first and second components is selectively exposed to said active species.

7. The method of claim 1 wherein the gas capable of discharge contains at least helium.

8. The method of claim 3 wherein the gas capable of discharge contains at least helium.

9. The method of claim 5 wherein the gas capable of discharge contains at least helium.

10. The method of claim 1 wherein the gas capable of discharge contains at least compressed air.

11. The method of claim 3 wherein the gas capable of discharge contains at least compressed air.

12. The method of claim 5 wherein the gas capable of discharge contains at least compressed air.

13. The method of claim 1 wherein the gas capable of discharge contains at least nitrogen.

14. The method of claim 3 wherein the gas capable of discharge contains at least nitrogen.

15. The method of claim 5 wherein the gas capable of discharge contains at least nitrogen.

16. The method of claim 1 wherein the gas capable of discharge contains at least one of helium and nitrogen, and oxygen.

17. The method of claim 5 wherein the gas capable of discharge contains at least one of helium and nitrogen, and oxygen.

18. The method of claim 1 wherein the gas capable of discharge contains at least one of helium and compressed air, and a fluorine compound.

19. The method of claim 5 wherein the gas capable of discharge contains at least one of helium and compressed air, and a fluorine compound.

20. The method of claim 1 further comprising the step of:

providing moisture proximate the portion while exposing the portion to the atmospheric plasma.

21. The method of claim 3 further comprising the step of:

providing moisture proximate the coated portion while exposing the coated portion to the atmospheric plasma.

22. The method of claim 5 further comprising the step of:

providing moisture proximate the portion while exposing the portion to the atmospheric plasma.

23. The method of claim 1 wherein the portion is directly exposed to the discharge.

24. The method of claim 3 wherein the coated portion is directly exposed to the discharge.

25. The method of claim 5 wherein the portion is directly exposed to the discharge.

26. The method of claim 20 wherein the portion is directly exposed to the discharge.

27. The method of claim 1 further comprising the step of:

providing a continuous supply of gas capable of discharge thereby forming a gas flow;

generating a discharge in said gas flow thereby creating a reactive gas flow of the atmospheric plasma; and directly exposing the portion to said reactive gas flow.

28. The method of claim 3 further comprising the step of:

providing a continuous supply of gas capable of discharge thereby forming a gas flow;

generating a discharge in said gas flow thereby creating a reactive gas flow of the atmospheric plasma; and directly exposing the coated portion to said reactive gas flow.

29. The method of claim 5 further comprising the step of:

providing a continuous supply of gas capable of discharge thereby forming a gas flow;

generating a discharge in said gas flow thereby creating a reactive gas flow of the atmospheric plasma; and directly exposing the coated portion to said reactive gas flow.

30. The method of claim 20 further comprising the step of:

providing a continuous supply of gas capable of discharge thereby forming a gas flow;

generating a discharge in said gas flow thereby creating a reactive gas flow of the atmospheric plasma; and directly exposing the coated portion to said reactive gas flow.

31. The method of claim 1 wherein high-frequency voltage is used for generating discharge.

32. The method of claim 1 wherein the brazing material is solder.

33. The method of claim 3 wherein the brazing material is solder.

34. The method of claim 5 wherein the brazing material is solder.

35. The method of claim 20 wherein the brazing material is solder.

36. The method of claim 32 wherein no flux is used.

37. The method of claim 32 wherein a no-rinse flux is used.

38. The method of claim 32 wherein one of said first and second components is a glass substrate; and wherein the gas capable of discharge is nitrogen.

39. An apparatus for bonding components together using a brazing material, comprising:

a surface-treater, said surface-treater including a discharger for generating discharge in a gas capable of discharge at or about atmospheric pressure thereby creating an atmospheric plasma with active species;

at least a portion of a first component being exposed to said atmospheric plasma with active species.

40. The apparatus of claim 39 wherein the gas capable of discharge contains at least an organic substance.

41. The apparatus of claim 39 further comprising:

a coater for coating an organic substance on the portion prior to being exposed to the atmospheric plasma.

42. The apparatus of claim 39 wherein the portion is exposed to the atmospheric plasma at least one of before, during, and after bonding the first component to a second component.

43. The apparatus of claim 39 wherein the surface-treater further includes:

a port shaped for selecting the portion from the entirety of a surface of the first component for exposure to the atmospheric plasma, thereby leaving areas of said surface not exposed to the atmospheric plasma.

44. The apparatus of claim 41 wherein the surface-treater further includes:

a port shaped for selecting the portion from the entirety of a surface of the first component for exposure to the atmospheric plasma, thereby leaving areas of said surface not exposed to the atmospheric plasma.

45. The apparatus of claim 39 wherein the portion is grounded, and wherein the discharger further includes:

an electrode coupleable to a power supply; and wherein the discharge is generated between said electrode and said grounded portion thereby directly exposing the portion to the discharge.

46. The apparatus of claim 41 wherein the coated portion is grounded, and wherein the discharger further includes:

an electrode coupleable to a power supply; and wherein the discharge is generated between said electrode and said grounded coated portion thereby directly exposing the coated portion to the discharge.

47. The apparatus of claim 43 wherein the portion is grounded, and wherein the discharger further includes:

an electrode coupleable to a power supply; and wherein the discharge is generated between said electrode and said grounded portion thereby directly exposing the portion to the discharge.

48. The apparatus of claim 39 wherein the discharger further includes:

a continuous supply of gas capable of discharge forming gas flow, a first electrode coupleable to a power supply, and a second electrode that is grounded; and wherein discharge is generated in said gas flow thereby creating a reactive gas flow of the atmospheric plasma, and wherein the portion is directly exposed to said reactive gas flow.

49. The apparatus of claim 41 wherein the discharger further includes:

a continuous supply of gas capable of discharge forming a gas flow, a first electrode coupleable to a power supply, and a second electrode that is grounded; and wherein discharge is generated in said gas flow thereby creating a reactive gas flow of the atmospheric plasma, and wherein the coated portion is directly exposed to said reactive gas flow.

50. The apparatus of claim 43 wherein the discharger further includes:

a continuous supply of gas capable of discharge forming a gas flow, a first electrode coupleable to a power supply, and a second electrode that is grounded; and wherein discharge is generated in said gas flow thereby creating a reactive gas flow of the atmospheric plasma, and wherein the portion is directly exposed to said reactive gas flow.

51. The apparatus of claim 48 wherein the discharger further includes:

a tube for directing the reactive gas flow, said tube having a nozzle for permitting the reactive gas flow to escape; and wherein the portion is directly exposed to the reactive gas flow escaping the discharger through said nozzle.

52. The apparatus of claim 49 wherein the discharger further includes:

a tube for directing the reactive gas flow, said tube having a nozzle for permitting the reactive gas flow to escape; and wherein the portion is directly exposed to the reactive gas flow escaping the discharger through said nozzle.

53. The apparatus of claim 50 wherein the discharger further includes:

a tube for directing the reactive gas flow, said tube having a nozzle for permitting the reactive gas flow to escape; and wherein the portion is directly exposed to the reactive gas flow escaping the discharger through said nozzle.

54. A method for integrally bonding two parts to each other with solder, comprising the steps of:

providing two parts, each having respective surfaces;

introducing a gas into a discharge generator at approximately atmospheric pressure to generate gas discharge and generate active species;

transferring the active species generated in the discharge generator into a nozzle section of an atmospheric plasma generation apparatus through a tube in fluid communication with the discharge generator and the nozzle section;

irradiating the surfaces with the active species; and then joining the surfaces with solder.

55. The method of claim 54, wherein the active species include excited molecules and ions.

* * * * *

UNITED STATES PATENT AND TRADEMARK OFFICE
CERTIFICATE OF CORRECTION

PATENT NO. : 5,831,238
DATED : November 3, 1998
INVENTOR(S) : Miyakawa Takuya, Mori Yoshiaki, Kurashima Yohei and Anan Makoto It is certified that error appears in the above-indentified patent and that said Letters Patent is hereby corrected as shown below:

ON THE TITLE PAGE

[30]   Foreign Application Priority Data

12/09/93 [JP] JAPAN..................... 05-309440

Signed and Sealed this

Seventeenth Day of August, 1999

Attest:

Q. TODD DICKINSON

Attesting Officer      Acting Commissioner of Patents and Trademarks